United States Patent
Shannon

(12) 
(10) Patent No.: US 6,238,552 B1
(45) Date of Patent: May 29, 2001

(54) UNIVERSAL INSERT FOR A WATER PURIFIER

(76) Inventor: Roy T. Shannon, 1121 Reston Ave., Herndon, VA (US) 20170

( * ) Notice: Subject to any disclaimer, the term of this patent is extended or adjusted under 35 U.S.C. 154(b) by 0 days.

(21) Appl. No.: 09/391,658

(22) Filed: Sep. 7, 1999

Related U.S. Application Data

(60) Provisional application No. 60/099,311, filed on Sep. 4, 1998.

(51) Int. Cl.$^7$ .............................. B01D 24/12; B01D 27/02
(52) U.S. Cl. .......................... 210/94; 210/282; 210/448; 210/473; 210/477; 210/482; 210/502.1; 222/189.07
(58) Field of Search ............................... 210/94, 264, 265, 210/282, 266, 448, 451, 473, 477, 479, 481, 482, 489, 502.1; 222/189.07

(56) References Cited

U.S. PATENT DOCUMENTS

| | | | |
|---|---|---|---|
| D. 323,874 | * | 2/1992 | Hirman et al. . |
| 1,669,284 | * | 5/1928 | Chetham . |
| 3,705,651 | * | 12/1972 | Klein . |
| 3,747,767 | * | 7/1973 | Hankammer . |
| 3,780,867 | * | 12/1973 | Zirlis . |
| 4,212,743 | * | 7/1980 | Van Meter et al. . |
| 4,306,971 | * | 12/1981 | Hankammer . |
| 4,529,511 | * | 7/1985 | Breeden et al. . |
| 4,666,600 | * | 5/1987 | Hankammer . |
| 4,764,274 | * | 8/1988 | Miller . |
| 4,895,648 | * | 1/1990 | Hankammer . |
| 4,969,996 | * | 11/1990 | Hankammer . |
| 5,225,078 | * | 7/1993 | Polasky et al. . |
| 5,637,214 | * | 6/1997 | Kahana . |
| 5,652,008 | * | 7/1997 | Heiligman . |
| 5,989,424 | * | 11/1999 | Serenko et al. . |
| 6,099,729 | * | 8/2000 | Cella et al. . |

* cited by examiner

Primary Examiner—Joseph W. Drodge
Assistant Examiner—Terry K. Cecil
(74) Attorney, Agent, or Firm—Rodger H. Flagg

(57) ABSTRACT

A universal filter insert apparatus 10 for a water purifier includes a container insert 12 having substantially cylindrical or conical side walls 11 and an annular lip 17 at an upper portion thereof. A plurality of resilient sealing members 36 are stacked about the upper portion of the container. Each of the resilient sealing members includes (i) an internal sealing diameter 50 adapted to engage the container annular lip and (ii) a uniquely-shaped annular sealing flange 38 for engaging a filter receiving aperture 54 of a particular water purifier 52. At least one guide slot 22 extends along a portion of the bottom of the container insert. A granular filter medium is placed within the container insert and sealed therein with a container lid 30. The container lid has a plurality of apertures 34 sized to let water pass through and also includes a raised handle 32 for ease of insertion and removal of the universal filter insert. The annular sealing flanges are of various sizes and shapes in order to provide sealing engagement with apertures within a wide variety of water purifier housings.

20 Claims, 2 Drawing Sheets

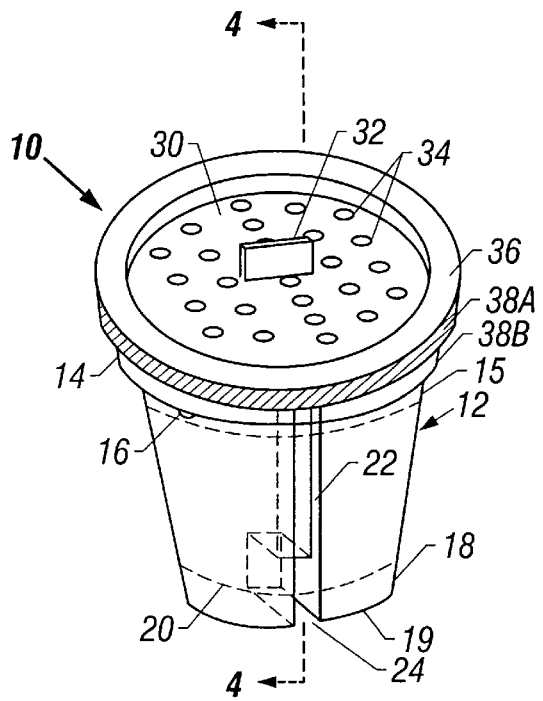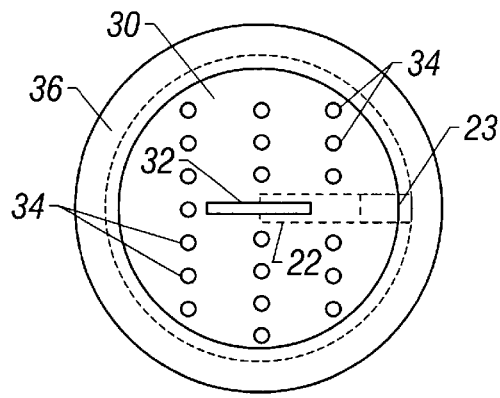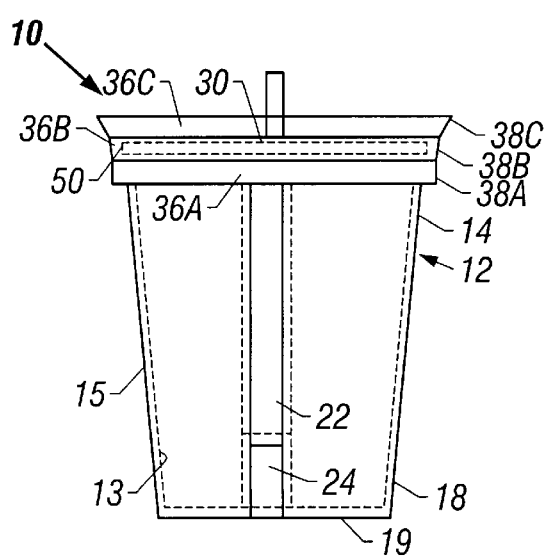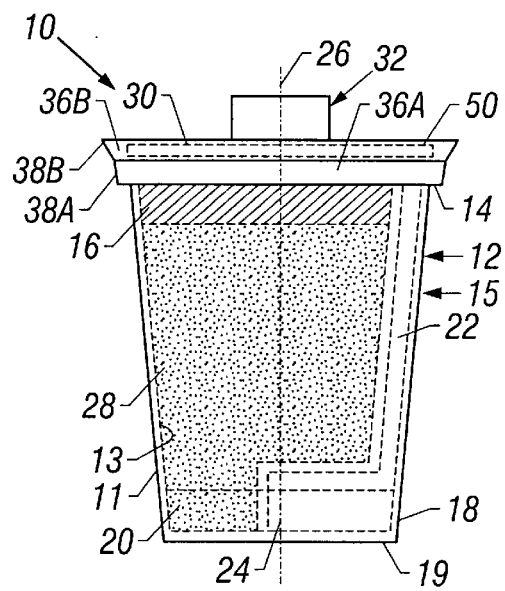
FIG. 1
FIG. 2
FIG. 3
FIG. 4

UNIVERSAL INSERT FOR A WATER PURIFIER

This application claims benefit to Provisional Application 60/099,311 filed Sep. 4, 1998.

BACKGROUND OF THE INVENTION

This application relates to a universal filter insert for use in a wide variety of water purifiers. Filter inserts for a water purifier are traditionally made for a specific water purifier. Some manufacturers even require different filter inserts for different models of their water purifiers. This complicates manufacturing, shipping and storage, requires multiple production runs, and increases prices. Therefore, what is needed is a universal filter insert for a water purifier, which will adapt the filter insert for use with a wide variety of water purifiers of varying sizes and shapes.

U.S. Pat. No. 4,666,600 issuing to Hankammer on May 19, 1987 discloses an insert for a water purifier with a cup portion connected thereto. The insert has at least one guide tube, and preferably multiple guide tubes assembled in concentric relationship with each other, with a filter means provided in the inner guide tube.

U.S. Pat. No. 4,764,274 issuing to Miller on Aug. 16, 1988, discloses a replaceable water filter unit utilizing activated charcoal particles sandwiched between a pair of felt pads.

U.S. Pat. No. 4,895,648 issuing to Hankammer on Jan. 23, 1990, discloses a filter cover for a purification insert in a water treatment device. Slots are provided on the conical surface portion, and at least one vent opening is provided in the middle of a raised connecting portion, and an adjustable pointer is rotatably connected to a hollow tube.

U.S. Pat. No. 4,306,971 issuing to Hankammer on Dec. 22, 1981, discloses a water purifying apparatus having a cup shaped insert with screen like closure members at the upper and lower ends, and a ventilation tube projects upward above the vertical height of the funnel-shaped member. A granular purifying agent is placed within the cup-shaped insert.

U.S. Pat. No. 5,637,214 issuing to Kahana on Jun. 10, 1997, discloses a water filter assembly having a filter bag of porous material housed in a filter housing. The filter housing has a plurality of elongated slots in the lower end of the filter housing, with slot-like apertures in the filter housing lid. The water filter assembly is adapted to be received in a water pitcher.

U.S. Pat. No. 3,780,867 issuing to Zirlis on Dec. 25, 1973 discloses a two stage water purification cartridge disposed within a housing. Water circulates from an inlet port in the cap through the outermost sleeve to the interior of the cartridge, and then out through an outlet port in the cap.

U. S. Pat. No. 3,705,651 issuing to Klein on Dec. 12, 1972 discloses a disposable filter unit for potable water, having an inner core filled with activated carbon and surrounded by porous material impregnated with diatomaceous earth.

U.S. Pat. No. 4,212,743 issuing to Van Meter et al. On Jul. 15, 1980 discloses a filter cartridge for water filters. Partitions within the cartridge define an elongated tortuous water flow path between the inlet and the outlet.

U.S. Pat. No. 3,747,767 issuing to Hankammer on Jul. 24, 1973, discloses a water treatment device formed of a funnel shaped part with an elongated tubular shaped shell connected to the funnel shaped part. The funnel shaped part is elastic and deforms when the shell is inserted to provide a seal-type engagement. Removable covers are provided for opposite ends of the shell.

U.S. Pat. No. 5,225,078 issuing to Polasky et al. On Jul. 6, 1993, discloses a pour-through pitcher assembly having a filter element with a thin annular disk of activated carbon, and a peripheral annular seal element.

U.S. design patent 323,874 issuing to Hirman et al on Feb. 11, 1992 discloses a removable filter element.

SUMMARY OF THE INVENTION

The universal filter insert for a water purifier disclosed herein, comprises a water purifier insert having substantially cylindrical or conical side walls. The universal filter insert includes a filter top portion and a filter bottom portion, with multiple sized annular sealing flanges releasably secured to the upper end of the cylindrical side walls. At least one guide slot extends along the side wall of the universal filter insert. Multiple apertures and a handle are provided on the top portion. Multiple annular sealing flanges are provided to adapt the universal filter insert for use with a wide variety of water purifier housings having different filter aperture sizes and shapes.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings, wherein:

FIG. 1 is a perspective view of the universal filter insert apparatus, with multiple sealing flanges positioned upon the filter top portion.

FIG. 2 is a top view of the universal filter insert apparatus shown in FIG. 1.

FIG. 3 is a side view of the universal filter insert apparatus shown in FIG. 1.

FIG. 4 is a cross sectional view of the universal filter insert apparatus taken along lines 4—4 in FIG. 1.

DESCRIPTION OF THE PREFERRED EMBODIMENT

Figure 5:
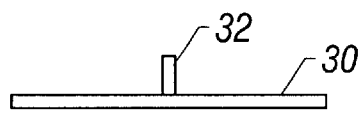
FIG. 5 is a side view of the top portion of the universal filter insert apparatus shown in FIG. 1.

As shown in FIG. 1 through FIG. 9, the universal filter insert apparatus 10 comprises a container insert 12, a base portion 19 connected to a side wall portion 11 extending above the base portion 19 to form an open ended enclosure therebetween. The side wall portion 11 has an inner side wall 13 and an outer side wall 15. The container insert 12 is preferably of conical or cylindrical configuration.

The container insert 12 preferably has an annular lip 17 extending about the upper portion 14. The annular lip 17 serves to provide a seal between the container insert 12 and the internal sealing diameter 50 of the resilient sealing member 36.

The container insert 12 is further provided with an upper portion 14 having a container lid 30. The container lid 30 has a plurality of lid apertures 34 disposed therein. The plurality of lid apertures 34 are sized to allow water to pass therethrough. The upper portion 14 of the container insert 12 also has an annular sealing flange 38 encircling the upper portion 14. The upper portion 14 of the container insert 12 may have an upper filter 16 positioned beneath the container lid 30. The lower portion 18 of the container insert 12 has a lower filter 20 disposed therein.

The base 19 of the container insert 12 has a plurality of base apertures 42 sized to allow liquid to flow therethrough. Base apertures 42 may be round or elongated, to suit manufacturing preference. The base 19 serves to retain the lower filter 24 within the container insert 12.

The container insert 12 may be molded of a suitable plastic material, with at least one guide slot 22 integrally molded into the outer side wall 15. The purpose of the guide slot 22 is to provide clearance for various obstructions placed in the filter housing by various manufacturers. The guide slot 22 preferably extends substantially between the upper and lower portions 16, 18, and the guide slot 22 preferably includes a lower extension 24, which extends substantially into the base 19 to provide clearance for various obstructions positioned in the water purifier housing 52 by various manufacturers. The lower extension 24 of the guide slot 22 preferably extends from the outer periphery of the container insert 12 past the central axis 26 of the universal insert apparatus 10.

The container insert 12 is preferably made of biodegradable materials for ease of disposal after use. The container insert 12 may be opaque, translucent or transparent to suit consumer preference.

The upper and lower filters 16, 20 are sufficiently porous to allow a fluid, such as water to pass there-through, while restricting passage of a granular filter medium 28 located between the upper and lower filters 16, 20. The upper and lower filters 16, 20 are preferably made of a nylon mesh foam material.

Preferably, the granular filter medium 28 is an activated carbon, which has been made substantially germ-free by a suitable surface treatment. One such surface treatment is by silver plating the surface of the activated carbon. Other granulates, such as ion exchangers, may also be used. The granular filter medium 28 is contained between the inner side wall 13 of the open ended container insert 12, the upper filter 16 and the lower filter 20.

The universal filter insert apparatus 10 has the advantage of being disposable, so that the user does not come in contact with the granular filter medium 28, and therefore does not inadvertently contaminate the granular filter medium 28. This significantly improves user hygiene as well as reducing cleanup.

The lower filter 20 is adapted to provide a fluid tight fit with the lower portion 18 of the inner side wall 13 of the container insert 12. The lower filter 20 may have a cutout sized to closely receive the lower extension 24 of the guide slot 22. Likewise, the upper filter 16 (when used) is adapted to provide a fluid tight fit with the upper portion 14 of the inner side wall 13 of the container insert 12. The upper filter 16 may have a cutout sized to closely receive the guide slot 22. Preferably, the upper and lower filters 16, 20 are made of bio-degradable porous foam material.

At least one guide slot 22 is recessed into the outer side wall 15 from the upper portion 14 to the lower portion 18, along the outer wall of the container insert 12, as best shown in cross section in FIG. 4. The guide slot 22 preferably includes a lower recessed portion 24, which extends substantially past the central axis 26 of the universal insert apparatus 10. The guide slot 22 may be any elongated recess configuration sized to provide clearance for one or more built-in obstructions found on some water filter apparatus.

Multiple guide slots 22 may also be provided to ensure clearance for a variety of built-in obstructions used by different manufacturers of water filters. Where multiple guide slots 22 are provided, they are positioned to provide clearance for various obstructions located in the filter receiving aperture 40 of various manufacturing designs of water filters. The guide slots 22 are positioned along the outer side wall 15 of the container insert 12, and may be of equal or unequal spacing between the multiple guide slots 22 to suit design and manufacturing preference.

As shown in FIG. 2 and FIG. 5, a container lid 30 is sized to fit securely upon the upper portion 14 of the container insert 12. The container lid 30 has a centrally located raised handle portion 32, for ease of placing or removing the container insert 12 in the filter receiving aperture 54 located in most new or existing brands of water filters.

Preferably, the outer diameter of the container lid 30 is press fit into the internal sealing diameter 50 after placing the granular filter medium 28 into the container insert 12. The container lid 30 further includes a plurality of lid apertures 34 extending through the container lid 30. The plurality of apertures 34 serve to allow liquid, such as water, to pass through the container lid 30, then through the upper filter 16 (when used), through the granular filter medium 28 located between the upper and lower filters 16, 20, and then through the lower filter 18, then through a plurality of apertures located in the base 19 of the container insert 12.

A suitable resilient sealing member 36 has a conforming annular sealing flange 38 sized to engage the filter receiving aperture 54 in the water purifier housing 52 to receive and seal the universal filter apparatus 10 therein. Different brands of water purifiers have different sized and shaped filter receiving apertures 54, which require a custom sized sealing member 36. This complicates storage and shipping, requires multiple production runs, increases the cost of the filter apparatus to the consumer, and at times limits availability. Thus, the universal filter apparatus 10 disclosed herein, has multiple sealing members 36a, 36b, etc. Each sealing member 36 is sized and shaped to engage the filter receiving aperture 54 in a selected water purifier housing 52 of a selected brand of water purifier.

The multiple sealing members 36 may be stacked about the central axis 26 of the universal housing apparatus 10. As shown in FIG. 3 and FIG. 4, the smallest conforming sealing flange 38a is positioned lower than an intermediate conforming sealing flange 38b, and the largest conforming sealing flange 38c is positioned above the intermediate conforming sealing flange 38b. Thus, the universal filter apparatus 10 disclosed herein, is adaptable for use in a variety of water purifiers having different sealing aperture 40 sizes which are sized to sealingly engage a selected annular sealing flange 38.

Figure 6:
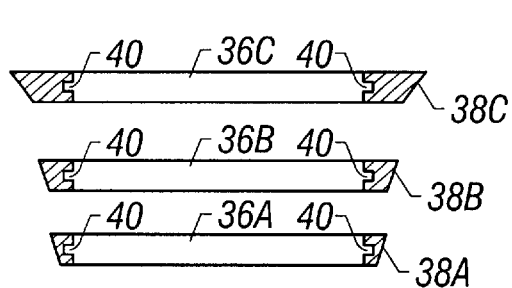
FIG. 6 is an exploded view of the multiple sealing flanges, each sealing flange having a different peripheral configuration.

Alternately, as shown in FIG. 6, multiple resilient sealing members 36 may be provided, each having an inner filter receiving aperture 40 sized to engage and seal against the annular lip 17 located on the container insert 12, and an outer annular sealing flange 38 sized to engage and seal against the water purifier aperture 54 located in a selected new or existing water purifier 52. One of the multiple resilient sealing members 36 is selected to suit the size and shape of the water purifier aperture 54, and the inner diameter 50 of the selected resilient sealing member 36 is mounted upon the annular lip 17.

When the container insert 12 is positioned in the water purifier aperture 54 located in the selected water purifier 52, the annular sealing flange 38 of the selected sealing member 36 engages the lip portion of the water purifier aperture 54 to provide a suitable fluid tight seal there-between.

Figure 7:
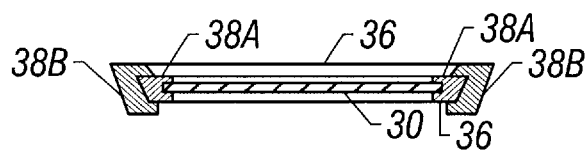
FIG. 7 is a cross sectional view showing two concentric sealing members which may be joined together to seal the universal filter insert to a specific water filter aperture.
Figure 8:
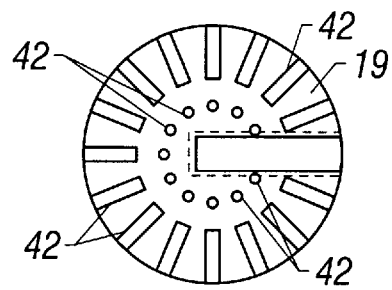
FIG. 8 is a bottom view of the universal filter apparatus shown in FIG. 4.
Figure 9:
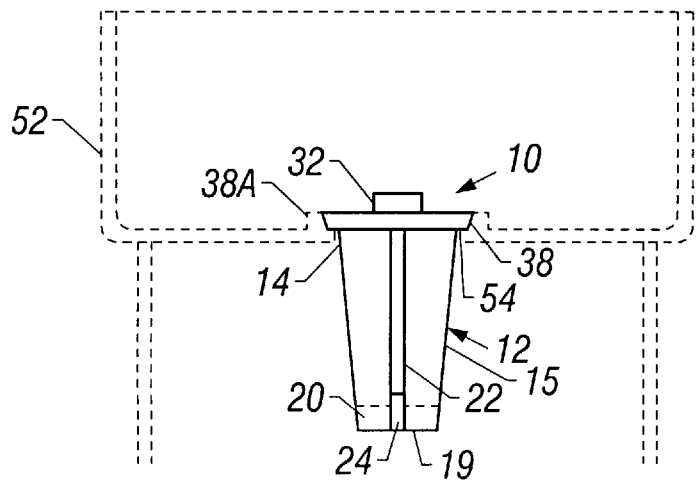
FIG. 9 is an example embodiment of the universal filter apparatus installed within a water purifying apparatus housing.

Alternately, as shown in FIG. 7, the container insert 12 may include a first resilient sealing member 36 having an internal sealing diameter 50 sized to sealingly engage the annular lip 17 positioned on the container insert 12, and an outer annular flange 38A sized to receive a larger resilient sealing member thereon. In this embodiment, multiple resilient sealing members 36 may be concentrically aligned, with the annular sealing flange 38A of a smaller resilient sealing member engaging the inner sealing diameter 50 of a larger resilient sealing member 36. In this way, the universal filter apparatus 10 disclosed herein, may be adapted to suit a wide variety of aperture sizes required by a variety of existing water filter apparatus.

Several sized and shaped sealing members 36 will accommodate most commercially available water purifiers. Thus, while only several sizes are shown in FIG. 3, FIG. 4, FIG. 6 and FIG. 7, it is to be understood that this is illustrative of the preferred embodiment of this invention, and is not intended to be limiting as to the number of sealing members 36 provided with the universal filter apparatus 10.

The resilient sealing member 36 is preferably made of non-porous material, and may be stamped, molded, formed or shaped to suit manufacturing preference. The resilient sealing member is preferably made of biodegradable material.

To use, the universal filter apparatus 10 is inserted into the filter receiving aperture 54 located in a selected water purifier 52. The appropriate annular sealing flange 38 is positioned to engage the water purifier 52 sealing aperture 54. Because multiple sealing members 36 are provided with selected size and shapes, most of the commercially available water purifiers can utilize the universal filter apparatus 10 disclosed herein.

Once the universal filter apparatus 10 has been inserted into the water purifier sealing aperture 54 and the annular sealing flange 38 sealed thereon, a suitable liquid, such as water, may be poured over the container lid 30, where the liquid seeps through the plurality of apertures 34 provided in the container lid 30. The liquid passing through the plurality of apertures 34 then passes through the upper filter 16 (when used) located in the upper portion 14 of the open ended container 12. The partially filtered water then passes through a suitable granular filter medium 28 located between the inner side wall 13 of the container insert 12, and through the lower filter 20 located in the lower portion 18 of the container insert 12.

Impurities are entrained in the upper and lower filters 16, 20, and in the granular filter medium 28 located between the upper and lower filters 16, 20, within the container insert 12. Periodically, the universal filter apparatus 10 is removed and replaced as needed. The raised handle portion 32 located on the container lid 30 makes insertion and removal of the container insert 12 from the water purifier housing 52 easy.

Because of low cost, the universal filter apparatus 10 may be easily disposed of, and replaced as needed. The liquid passing through the universal filter apparatus 10 is thus filtered to remove most impurities found in the liquid to be filtered.

The universal filter apparatus 10 disclosed herein, is adaptable for use in most commercially available water filters 52, thus eliminating the need to stock or store multiple filters to accommodate specific water filter 52 models or brands.

Thus, while the universal filter apparatus 10 has been fully described and disclosed as a preferred embodiment herein, numerous modifications and adaptations will become apparent to one of ordinary skill in this art, and such modifications and adaptations are intended to be included within the scope of the following claims.

UNIVERSAL FILTER APPARATUS

10 UNIVERSAL FILTER APPARATUS
11 side wall portion
12 container insert
13 inner side wall
14 upper portion
15 outer side wall
16 upper filter
17 annular lip
18 lower portion
19 base
20 lower filter
22 guide slot
24 lower extension
26 central axis
28 granular filter medium
30 container lid
32 raised handle portion
34 plurality of lid apertures
36A resilient sealing member
36B resilient sealing member
36C resilient sealing member
38A annular sealing flange
38B annular sealing flange
38C annular sealing flange
42 base apertures
44 concentric rings
50 internal sealing diameter
52 water purifier housing
54 water purifier aperture

I claim:

1. A universal filter insert apparatus for a water purifier, said insert apparatus comprising:

a. a base portion having a plurality of apertures sized to let water pass therethrough;

b. a side wall portion secured to the base portion, the side wall portion having an inner wall and an outer wall which extends above said base portion to form an open ended enclosure therebetween, the side wall portion further having an annular lip encircling an upper portion of said side wall portion;

c. a plurality of resilient sealing members stacked about said upper portion, each said resilient sealing member having (i) an internal sealing diameter adapted to engage said annular lip and (ii) a uniquely-shaped annular sealing flange for engaging a filter receiving aperture of a particular water purifier;

d. at least one guide slot integrally molded into the outer side of the side wall portion, the guide slot extending from the annular lip to the base portion, the guide slot having a lower extension extending from the outer side of the side wall portion past a central axis of the universal insert filter apparatus;

e. a container lid sized to sealingly fit on said resilient sealing members encircling the upper portion of the filter insert, the container lid having a plurality of apertures sized to allow water to pass therethrough;

f. a lower filter disposed adjacent to the base portion and the inner wall of the side wall portion, the lower filter being sufficiently porous to allow a fluid to pass therethrough, while restricting passage of a granular filter medium; and g. a granular filter medium disposed between the lower filter, the inner wall of the side wall portion and the container lid.

2. The universal filter insert apparatus of claim 1, wherein an upper filter is provided adjacent to the container lid and the upper portion of the inner side of the universal filter insert, the upper filter being sufficiently porous to allow a fluid to pass therethrough, while restricting passage of the granular filter medium; with the granular filter medium disposed between the lower filter, the inner wall of the side wall portion and the upper filter.

3. The universal filter insert apparatus of claim 1, wherein the base portion, the side wall and the container lid are made of biodegradable materials for ease of disposal after use.

4. The universal insert filter apparatus of claim 1, wherein at least a portion of the plurality of apertures in the base portion comprise elongated slots.

5. The universal insert filter apparatus of claim 1, wherein the granular filter medium is an activated carbon, which is made substantially germ free by silver plating the surface of the activated carbon.

6. The universal insert filter apparatus of claim 1, wherein at least one of the base portion, the side wall portion and the container lid is selected to be transparent.

7. The universal insert filter apparatus of claim 1, wherein at least one of the base portion, the side wall portion and the container lid is selected to be translucent.

8. The universal insert filter apparatus of claim 1, wherein the lower filter is made of an open mesh, nylon foam material.

9. The universal insert filter apparatus of claim 1, wherein an outer diameter of said container lid is press fit into the internal sealing diameter of one of said resilient sealing members.

10. A universal filter insert apparatus for a water purifier, said insert apparatus comprising:

a. a base portion having a plurality of apertures sized to let water pass therethrough;

b. a side wall portion secured to the base portion, the side wall portion having an inner wall and an outer wall which extends above said base portion to form an open ended enclosure therebetween, the side wall portion further having an annular lip encircling an upper portion of said side wall portion;

c. a plurality of resilient sealing members stacked about said upper portion, each said resilient sealing member having (i) an internal sealing diameter adapted to engage said annular lip and (ii) a uniquely-shaped annular sealing flange for engaging a filter receiving aperture of a particular water purifier;

d. at least one guide slot integrally molded into the outer side of the side wall portion, the guide slot extending from said plurality of resilient sealing members to the base portion, the guide slot having a lower extension extending from the outer side of the side wall portion past a central axis of the universal insert filter apparatus;

e. a container lid sized to sealingly fit on said resilient sealing members encircling the upper portion of the filter insert, the container lid having a plurality of apertures sized to allow water to pass therethrough;

f. a lower filter disposed adjacent to the base portion and the inner wall of the side wall portion, the lower filter being sufficiently porous to allow a fluid to pass therethrough, while restricting passage of a granular filter medium;

g. an upper filter disposed adjacent to the container lid and the upper portion of the inner side of the universal filter inset, the upper filter being sufficiently porous to allow a fluid to pass therethrough, while restricting passage of a granular filter medium; and h. a granular filter medium disposed between the lower filter, the inner wall of the side wall portion and the container lid.

11. The universal insert apparatus of claim 10, wherein the granular filter medium is an activated carbon, which is made substantially germ free by silver plating the surface of the activated carbon.

12. The universal insert apparatus of claim 10, wherein the base portion, the side wall and the container lid are made of biodegradable materials for ease of disposal after use.

13. The universal insert filter apparatus of claim 10, wherein at least a portion of the plurality of apertures in the base portion comprise elongated slots.

14. The universal insert filter apparatus of claim 10, wherein at least a portion of the plurality of apertures in the container lid comprise elongated slots.

15. The universal insert filter apparatus of claim 10, wherein at least one of the base portion, the side wall portion and the container lid is selected to be transparent.

16. The universal insert filter apparatus of claim 10, wherein at least one of the base portion, the side wall portion and the container lid is selected to be translucent.

17. The universal insert filter apparatus of claim 10, wherein the upper filter and the lower filter are each made of an open mesh, nylon foam material.

18. The universal insert filter apparatus of claim 10, wherein an outer diameter of said container lid is press fit into the internal sealing diameter of one of said resilient sealing members.

19. A universal filter insert apparatus for a water purifier, said insert apparatus comprising:

a. a base portion having a plurality of apertures sized to let water pass therethrough;

b. a side wall portion secured to the base portion, the side wall portion having an inner wall and an outer wall which extends above said base portion to form an open ended enclosure therebetween, the side wall portion further having an annular lip encircling an upper portion of said side wall portion;

c. a plurality of resilient sealing members stacked about said upper portion, each said resilient sealing member having (i) an internal sealing diameter adapted to engage said annular lip and (ii) an annular sealing flange for sealingly engage an aperture of a particular water purifier, wherein each one of said annular sealing flanges have a different annular diameter and are positioned such that a smallest annular diameter is located closest to the base, and a largest annular diameter is located above said smallest annular diameter;

d. at least one guide slot integrally molded into the outer side of the side wall portion, the guide slot extending from the annular to the base portion, the guide slot having a lower extension extending from the outer side of the side wall portion past a central axis of the universal insert filter apparatus;

e. a container lid sized to sealingly fit on said resilient sealing members encircling the upper portion of the filter insert, the container lid having a plurality of apertures sized to allow water to pass therethrough;

f. a lower filter disposed adjacent to the base portion and the inner wall of the side wall portion, the lower filter being sufficiently porous to allow a fluid to pass therethrough, while restricting passage of a granular filter medium;

g. an upper filter disposed adjacent to the container lid and the upper portion of the inner side of the universal filter insert, the upper filter being sufficiently porous to allow a fluid to pass therethrough, while restricting passage of a granular filter medium; and h. an activated granular filter medium disposed between the lower filter, the inner wall of the side wall portion and the upper filter.

20. The universal insert filter apparatus of claim 19, wherein at least a portion of the plurality of apertures in the base portion comprise elongated slots.

* * * * *